Patented Apr. 13, 1943

2,316,621

UNITED STATES PATENT OFFICE 2,316,621

PROCESS OF TREATING EDIBLE OILS OR FATS

Herbert Otto Renner, Des Plaines, Ill., assignor, by mesne assignments, to J. R. Short Milling Company, Chicago, Ill., a corporation of Illinois No Drawing. Application December 13, 1938, Serial No. 245,502. In Great Britain December 14, 1937

12 Claims. (Cl. 99—118)

The present invention relates to a process for controlling or counteracting the odor or flavor of vegetable and animal glycerides of fatty acids and, more particularly, to a process for removing or changing the undesirable odors and flavors produced and imparted to such oils and fats during the enzyme oxidation of refined edible oils and fats, for instance according to the method described in Patent No. 1,994,992, Haas and Renner, patented March 19, 1935.

The off-odors and off-flavors of oils and fats encountered under various conditions are due to the presence of certain substances, the chemical constitution of which is not clearly understood. These substances appear to be more or less volatile, odorous cleavage products of highly unsaturated fatty glycerides; so-called $C_7$- and $C_9$- bodies such as short chain aldehydes, for instance, valeraldehyde, heptylaldehyde, pelargonic aldehyde (nonaldehyde); high-molecular semi-aldehydes such as glycerol alpha beta distearine gamma azelaic-semialdehyde which catalyzes spoilage of oils and fats; ketones and keto-compounds formed in the decomposition of proteins, esters, and volatile carboxylic acids; and other unknown substances producing and/or affecting the odors or flavors of edible oils and fats. The nature and number of these substances serve to illustrate the complexity of the problem that confronts those engaged in the refining of oils and fats.

The present invention has to do primarily with the removal of the organoleptic effect of substances of the above-mentioned types without destruction of the essential characteristics of the oils or fats treated and/or without substantially changing the composition of the glycerides of such oils or fats.

According to the present invention, an oil or fat is treated with or allowed to be acted upon by enzymes obtained from or contained in living micro-organisms. In one method enzymes contained in the micro-organisms or their cultures in a suitable culture medium are mixed with the oil or fat to be treated and the mixture allowed to mature, the maturing time depending upon the type and quantity of micro-organism employed, the reaction conditions, and the degree to which the control of the odor or flavor of the oil or fat is desired.

The micro-organisms forming the source of the enzymes employed may be living bacteria, yeasts or moulds which may be cultured or wild. Instead of living micro-organisms it is preferable and more effective to use constituents of the cells of micro-organisms such constituents being for example contained in yeast juices, yeast autolysates, mould juices, mould autolysates, culture media acted upon by the living micro-organisms or their active principles and more or less freed of said living micro-organisms.

Fresh yeast juice has been found particularly useful in the present process. Such juice contains the following enzymes in large quantities: carboxylase, catalase, invertase, maltase, melibiase, zymase. Other enzymes such as the following are found in moderate amounts: reductase, phosphatase, oxidase, and endotryptase. Still others are found in the juice in small amounts, namely, amygdalase, emulsin, lipase, rennet, and trehalase.

Plasmolyzed yeast is preferably used to prevent undesirable inactivation of some enzymes and activation of certain other enzymes. The use of such yeast prevents the introduction of putrid and other odors in the oil to be refined and also prevents contamination of the oil with live bacteria associated with the spoilage and putrification of food. Autolyzed yeast may also be successfully used. In some cases enzymes contained in living yeast that has not been plasmolyzed, autolyzed, macerated, or crushed, may be employed without the addition of stimulating sugar. Enzymes contained in wild yeasts and bacteria from the atmosphere are also effective in refining during rather extended aging periods of the reaction mixtures prepared according to the process set forth in Patent No. 1,994,992.

Micro-organisms for use in the present process may be plasmolyzed by contacting the living cells with dry substances such as crystalloids having high diffusivity in water. Such substances should have no destructive inhibitory effect upon the enzymes in the cells, no objectionable odors, should be nonpoisonous, and should not be otherwise objectionable from the standpoint of human consumption. Among the plasmolyzing agents that are found suitable the following are mentioned: sodium chloride, anhydrous calcium chloride, cane sugar, and glycerine.

Plasmolyzed yeast which is particularly useful in the present process may be prepared as follows:

The quantity of fresh compressed bakers' yeast necessary to refine a given quantity of oil is crumbled up and placed in a container. A small amount of powdered calcium chloride or liquid glycerine is added and worked into the yeast until complete liquefaction is observed. A minimum amount of plasmolyzing material required to obtain liquefaction is about two percent by weight based on the weight of the compressed yeast.

By means of the above-mentioned means of obtaining the refining-enzymes, namely, plasmolysis, autolysis, maceration, crushing or other suitable mechanical means, the protective cell walls of the micro-organisms are broken down and the cell contents are freed.

The action of the enzymes may be controlled by the pH value of the substrate and the specific temperature conditions employed. The requirements of the micro-organisms and the enzymes contained therein as for instance temperature, concentration of cations and/or anions in the substrate, amounts of oxygen present to produce optimum reaction, influence the selection of the methods to be adopted for the control of the reaction to obtain the desired result. Substances initially present as in reaction mixtures of edible oil and enzymic extract obtained according to the processes described in Patent No. 1,994,992 may be acted upon by, or may act upon, the mixture of enzymes found in plasmolyzed yeast.

As set forth in the above-mentioned specification, the enzyme-oxidized oil product to which the present process may be applied, may be prepared, for example, by mixing oxidizing enzymes found in unheat-treated soya beans for instance, with a fatty acid material such as peanut oil or cottonseed oil and introducing a gas such as air containing free oxygen. The oxidizing enzymes serve to catalytically effect the oxidation of the fatty acid material. The oxidized material has been found highly useful in bread baking processes, serving both as a shortening agent and a dough-bleaching agent.

Oils and fats, which during storage have undergone certain changes manifesting themselves usually by undesirable odors or flavors, may be refined equally as well as the above oxidized oil by the herein disclosed refining methods. Due to the fact that during more or less extended storage of enzyme-oxidized oils, the formation of undesirable odors or flavors seems to reach a maximum, artificial aging of the oils or fats previous to enzyme refining may be combined with the above refining methods and result in products the stability of which as to odor or flavor is increased over more extended keeping periods.

Enzyme-refining of oils or fats is apparently the result of chemical changes of the odoriferous substances causing "off" odors or flavors. The reaction products of the enzymic processes dealt with herein are by no means all odorless and flavorless, although in most cases under observation they have either very bland odors or flavors or pleasant or agreeable odors or flavors commonly associated with appetizing human food. If in spite of this fact, perfect blandness or substantially complete freeness from any odor or flavor is desired, gas-refining of the enzyme-refined oils or fats has been found to be very useful. By gas-refining is meant the passage of preferably an inert gas through the enzyme-refined oil at moderate temperatures, whereby those odoriferous substances contained in the oil and volatile at those temperatures are carried away with the stream of gas. In contrast to common deodorization methods which employ high temperatures, steam and vacuum, gas-refining does not endanger the stability of the oil, nor decrease the oxidizing power of enzyme-oxidized oils and does not require expensive apparatus.

When considering the facts disclosed above, it should be realized that the odors and flavors of oils or fats, particularly of enzyme-oxidized oils or fats, do not necessarily indicate or serve in predicting the odors or flavors of baked loaves of bread to which said oils or fats have been added for shortening and/or bleaching purposes, i. e., a refined fat with a perfectly bland odor or flavor may produce a loaf having off odor or flavor or vice versa.

The following examples serve to illustrate the subject matter of the present invention without intending to limit the scope thereof:

*Example 1*

To 2000 parts by weight of a nine months old enzyme-oxidized peanut oil prepared according to Patent No. 1,994,992 having a rancid odor and flavor, about 2000 parts by weight of tap water at 24.4° C. (76° F.), and about 40 parts by weight (equivalent to about 2% of the weight of the oil and about 2% of the water) of plasmolyzed compressed yeast are added. The mix is constantly and thoroughly agitated, while avoiding aeration, for 1½ hours at about 24.4° C. and for an additional three hours at about 35° C. (95° F.) After keeping the mix at rest at room temperature in an atmosphere of carbon dioxide for a period equivalent to overnight, the refined oil is isolated by supercentrifuging.

The separated, refined, peroxidized oil has a bland odor and a pleasant, slightly nutty flavor. The peroxide content of the oil is not changed during the processing. The enzyme-refining is not a temporary one and is not followed by an early reversion of odor and flavor as evidenced by the fact that the oil after 5½ months of storage in a refrigerator retains its bland odor and flavor.

*Example 2*

5000 parts by weight of peanut oil are oxidized at 20° C. in the presence of about 1000 parts by weight of concentrated soy flour extract (obtained by mixing about 200 parts by weight of enzyme-active soy flour in about 1200 parts by weight of 0.2% calcium chloride solution in water and centrifuging) diluted with about 5000 parts by weight of 0.1% calcium chloride solution.

The oil contained in the above reaction mixture after processing has a peculiar odor and flavor of its own. After adding about 100 parts by weight of plasmolyzed yeast and agitating at 24° C. for about 5 minutes, the odor and flavor are completely changed. The pH during this refining process may be about 6.5.

The product obtained in the last example is found to be of pleasant taste and smell and the peroxide content of the oxidized oil remains unchanged.

In the process set forth in Example 2, it is found that the speed of the enzyme-refining process is dependent upon the quantity of enzymes employed, upon the degree of contacting or agitation maintained during processing between oil and the aqueous phase containing the enzymes, upon the concentration of the latter in the aqueous phase, and upon the degree to which the oil to be refined is contaminated with off-odors or off-flavors. The short reaction period required for complete enzyme-refining in the last example is highly important commercially. In certain prior processes maturing periods of ten hours were commonly employed.

*Example 3*

An enzyme oxidized peanut oil of unsatisfactory odor and flavor, prepared from 3000 parts by weight of peanut oil mixed at a temperature of 13.3° to about 29.4° C. (56 to 85° F.) successively with about 3000 parts by weight of dilute extract of oxidizing enzymes (prepared from about 4000 parts by weight of water, 4 parts by weight of calcium chloride and 40 parts by weight of enzyme active soya flour, the total mixture having a pH of 7.0), and about 300 parts by weight of concentrated oxidizing enzyme extract (prepared from about 1000 parts by weight of water, 2 parts by weight of calcium chloride and 178 parts by weight of enzyme active soya flour, the entire mixture having a pH of 5.5 to 5.4) may be treated as follows after separation of the oil by centrifuging. After the above reaction mixture has been brought to about 48.8° C. (120° F.) by indirect heating, about 3 parts by weight of plasmolyzed yeast (equivalent to about 0.1% of the weight of oil present) are added to the mixture and the whole moderately agitated for about three hours. The pH of the mixture is maintained constant at about 7.0 to 7.1. The pH of the aqueous fraction after centrifuging and isolation of the oil is about 6.7. The resulting enzyme-refined oil obtained is of light yellow color and has a mild, bland taste and smell. Its peroxide content is unaffected by the processing.

In Example 3, it is noted that the speed of the enzyme refining process is directly related to the quantity of enzymes employed and the concentration of the latter in the aqueous phase. This example further indicates the advantages of employing refining enzymes in amounts low enough to permit control of the refining reactions over extended reaction periods. A highly satisfactory range of proportions of plasmolyzed yeast is found to be from about 0.05% to about 1.0% of the weight of the oil or fat treated. Certain undesirable results such as the development of acidity causing ester- or fruit-like odors or flavors or pronounced yeasty odors or flavors are avoided. Such odors or flavors are most likely to be obtained by the use of relatively high amounts of enzymes under conditions poorly controlled with respect to pH and temperature.

*Example 4*

A reaction mixture containing about 3000 parts by weight of enzyme-oxidized peanut oil is prepared as set forth in Example 3 with the exception that the soya bean extracts are prepared from soya flour substantially completely freed of oil and lecithin by extraction with a mixed solvent.

The above reaction mixture is pasteurized by indirectly heating to about 65.5° C. (150° F.) while moderately agitating and maintaining this temperature for about 30 minutes, and finally cooling to about 37° C. (98.6° F.) within one and one-half hours.

About 0.1% of plasmolyzed yeast based on the weight of the oil treated is added to the pasteurized reaction mixture and the enzyme refining thereof carried out at about 26° to 49° C. (78.8° to 120.2° F.) for about seventeen and three-quarter hours. The pH of the mixture is maintained at about 6.8 to 7.0 by the addition of very small amounts (ranging around 0.005% of the weight of the oil treated of urea. The enzyme urease (derived from the soya flour) contained in the aqueous fraction of the above reaction mixture instantaneously generates ammonia by acting on the urea. This ammonia serves as a neutralizing agent. Other neutralizing agents such as sodium bicarbonate, secondary sodium phosphate, sodium hydroxide, etc. may be used instead of urea.

The resulting enzyme-refined mixture is gas-refined at 27° to 30° C. (80.6° to 86° F.) by blowing therethrough an inert gas such as carbon dioxide during vigorous agitation for about one and one-quarter hours. A washing or scrubbing effect is produced by the gas. After supercentrifuging to isolate oil, the latter is found to have a very mild and bland odor and flavor. Its peroxide content substantially equals that of the unrefined peroxidized oil.

In the process of Example 4, it is noted that if small proportions of refining enzymes are employed, the extension of refining periods over the minimum period required to accomplish the desired result, does not endanger the quality of the oil treated. This is considered very important in commercial production particularly from the standpoint of the possibility of break-down of equipment. The process of Example 4 further illustrates the use of pasteurization of reaction mixtures previous to enzyme-refining as a means of process control. It is also shown that the pH of reaction mixtures may be controlled, during enzyme-refining, by means of the use of enzymes such as urease, in combination with the urea, introduced as a part of the soya bean extracts into a system but not participating in the oxidation and refining processes.

In this latter example, gas-refining is effectively combined with enzyme-refining to produce the refined oils having the desired characteristics. It has been further found that in gas-refining of the above reaction mixtures containing enzymes of micro-organisms, such as those contained in plasmolyzed yeast, the inert carbon dioxide gas used above may be replaced by pure air. In this instance, the enzymes contained in plasmolyzed yeast appear to act as protective agents for the oils by preventing the reaction of the oxygen of the air with unsaturated fatty glycerides.

The process of Example 4 may be further altered by pasteurizing the oil and oxidizing enzyme reaction mixture both before and after enzyme-refining, or merely after the ensyme-refining steps.

*Example 5*

A reaction mixture is prepared similar to that described in Example 3 and is permitted to rest for about an hour after which 90% of the aqueous phase may be readily drained off whereby most of the soya bean proteins, soya enzymes and odoriferous substances carried by the aqueous phase are also removed. The quantity of liquid withdrawn is replaced by a similar quantity of fresh water and agitated. The resulting mixture is aged by vigorous agitation, and aeration at about 29.4° C. (85° F.) by suitable mechanical means for about two hours. The mix is permitted to rest for about fifteen and one-half hours, after which the pH is adjusted to 7.0. If the pH is below 7, it may be raised by adding 0.005% of urea based on the weight of the oil present and then aerating for an additional three hours. The residual amount of urease in the aqueous phase is sufficient to react with the urea which is thus added after the bulk of the soya bean material is withdrawn and it will decompose the .005% of urea added. This aged mixture is enzyme-refined with 0.1% of plasmolyzed yeast at 21° C. (17° F.) and with a pH of 6.8 as set forth in Examples 3 and 4. After thirty minutes of refining, the oil acquires a rather bland odor and flavor. Subsequent to separation of the oil by centrifuging, and after four and one-half hours of enzyme-refining, the oil has a very bland odor and flavor.

It is readily seen from the foregoing examples that numerous combinations and variations of the oil refining method are possible without departing from the spirit of the invention. The present process is not limited to enzyme-oxidized edible oils or fats nor to the production of oils or fats having merely bland odors or flavors. The process may also be employed to impart to any suitable edible oil or fat certain desirable odor or flavor characteristics for special purposes.

*Example 6*

3000 parts by weight of refined peanut oil enzyme-oxidized according to the method given in Example 3 and contained in about 6500 parts by weight of reaction mixture are refined, without being isolated from the latter, by the addition of 3 parts by weight of fresh, compressed bakers' yeast suspended in a small amount of water in order to prevent lumping, and continuous slight agitation for about 12–16 hours, processing temperature being kept at 100–110° F., pH of the mixture at 6.6–6.8. Supercentrifuging of the mixture produced a refined oil of mild bland odor and flavor. As only small amounts of refining enzymes diffuse through the unruptured cell membranes of living micro-organisms into the surrounding substrate, extended refining periods are required.

*Example 7*

This example serves to demonstrate the feasibility of enzyme-refining not enzyme-oxidized, animal fat refined by common methods.

1000 parts by weight of leaf lard of the trade are warmed to 40° C. with 1000 parts by weight of water, 8 parts by weight of freshly plasmolyzed yeast added and the whole vigorously agitated (avoiding aeration) at the given temperature. After 2 hours already a marked refinement of the odor and flavor of the fat could be noticed. The fat isolated from the reaction mixture after standing at ordinary temperature overnight had a pleasant mild lard odor and flavor and lost the very pronounced animal-like odor and flavor of the not-enzyme-refined lard so offensive to many.

The term "fat" used in the appended claims is applied in its technical sense and includes fats that are liquid (oils) or solid at atmospheric temperatures.

I claim:

1. A process of treating edible fats, which process comprises subjecting an edible fat having an undesirable odor or flavor to the action of the freed cell contents of yeast, obtained by disruption of the cell walls, to thereby counteract the organoleptic effect of substances in the fat causing the undesirable odor or flavor.

2. A process comprising subjecting an edible peroxidized fat having an undesirable odor or flavor to the action of the freed cell contents of yeast to thereby counteract the organoleptic effect of substances in the said fat causing the undesirable odor or flavor.

3. A process of treating edible fats, which process comprises subjecting an edible fat having an undesirable odor or flavor to the action of the freed cell contents of yeast, obtained by disruption of the cell walls, in the proportion of up to about 2% of the weight of the fat treated, to thereby counteract the arganoleptic effect of substances in the fat causing the undesirable odor or flavor.

4. A process of treating edible fats, which process comprises subjecting an edible fat having an undesirable odor or flavor to the action of the freed cell contents of plasmolyzed, commercial compressed yeast, in the proportion of from about 0.05% to about 1.0% of the weight of the fat treated, to thereby counteract the organoleptic effect of substances in the fat causing the undesirable odor or flavor.

5. A process of treating edible fats, which process comprises mixing together an edible fat having an undesirable odor or flavor, and the freed cell contents of fresh living yeast cells, obtained by disruption of the cell walls, until the undesirable odor or flavor of the fat is removed, and controlling the speed of the action, the degree of change of odor and flavor and the resulting characteristics of the fat, by the proportion of the said cell contents and the degree of agitation during mixing.

6. A process of treating edible fats, which process comprises subjecting an edible fat having an undesirable odor or flavor to the action of the freed enzymic cell contents of yeast, obtained by disruption of the cell walls, in the presence of water, the pH of the said water being controlled to prevent acidification, to thereby counteract the organoleptic effect of substances in the fat causing the undesirable odor or flavor.

7. A process of treating edible fats, which process comprises subjecting an edible fat having an undesirable odor or flavor to the action of the freed cell contents of yeast, obtained by disruption of the cell walls, and during a period outside the period of the said action pasteurizing the fat to render the action more specific, to thereby counteract the organoleptic effect of substances in the fat causing the undesirable odor or flavor.

8. A process of treating edible fats, which process comprises subjecting an edible fat having an undesirable odor or flavor to the action of the freed cell contents of yeast, obtained by disruption of the cell walls, the said action being preceded by aging of fat and yeast enzyme reaction mixtures to increase the stability of products of the reaction, to thereby counteract the organoleptic effect of substances in the fat causing the undesirable odor or flavor.

9. A process of treating edible fats, which process comprises subjecting an edible fat having an undesirable odor or flavor to the action of the freed cell contents of yeast, obtained by disruption of the cell walls, the said action being followed by blowing refining gas through the fat, to thereby counteract the organoleptic effect of substances in the fat causing the undesirable odor or flavor.

10. A process of treating edible fats, which process comprises subjecting an edible fat having an undesirable odor or flavor to the action of the freed cell contents of yeast, obtained by disruption of the cell walls, and during a period outside the period of the said action pasteurizing the fat, the said action being preceded by aging of fat and yeast enzyme reaction mixtures and followed by blowing refining gas through the fat, to thereby counteract the organoleptic effect of substances in the oil or fat causing the undesirable odor or flavor.

11. A process of treating edible fats, which process comprises subjecting an edible fat having an undesirable odor or flavor to the action of the freed cell contents of yeast, obtained by disruption of the cell walls, and blowing a refining gas containing free oxygen through the fat in the presence of yeast enzymes to prevent undesired oxidation, to thereby counteract the organoleptic effect of substances in the fat causing the undesirable odor or flavor.

12. A process comprising subjecting an edible peroxidized fat having an undesirable odor or flavor to the action of the freed cell contents of yeast, and blowing a refining gas containing free oxygen through the peroxidized fat in the presence of yeast enzymes to prevent undesired oxidation and thereby obtaining an edible peroxidized fat having desired odor and flavor characteristics.

HERBERT OTTO RENNER.